Patented Dec. 30, 1930

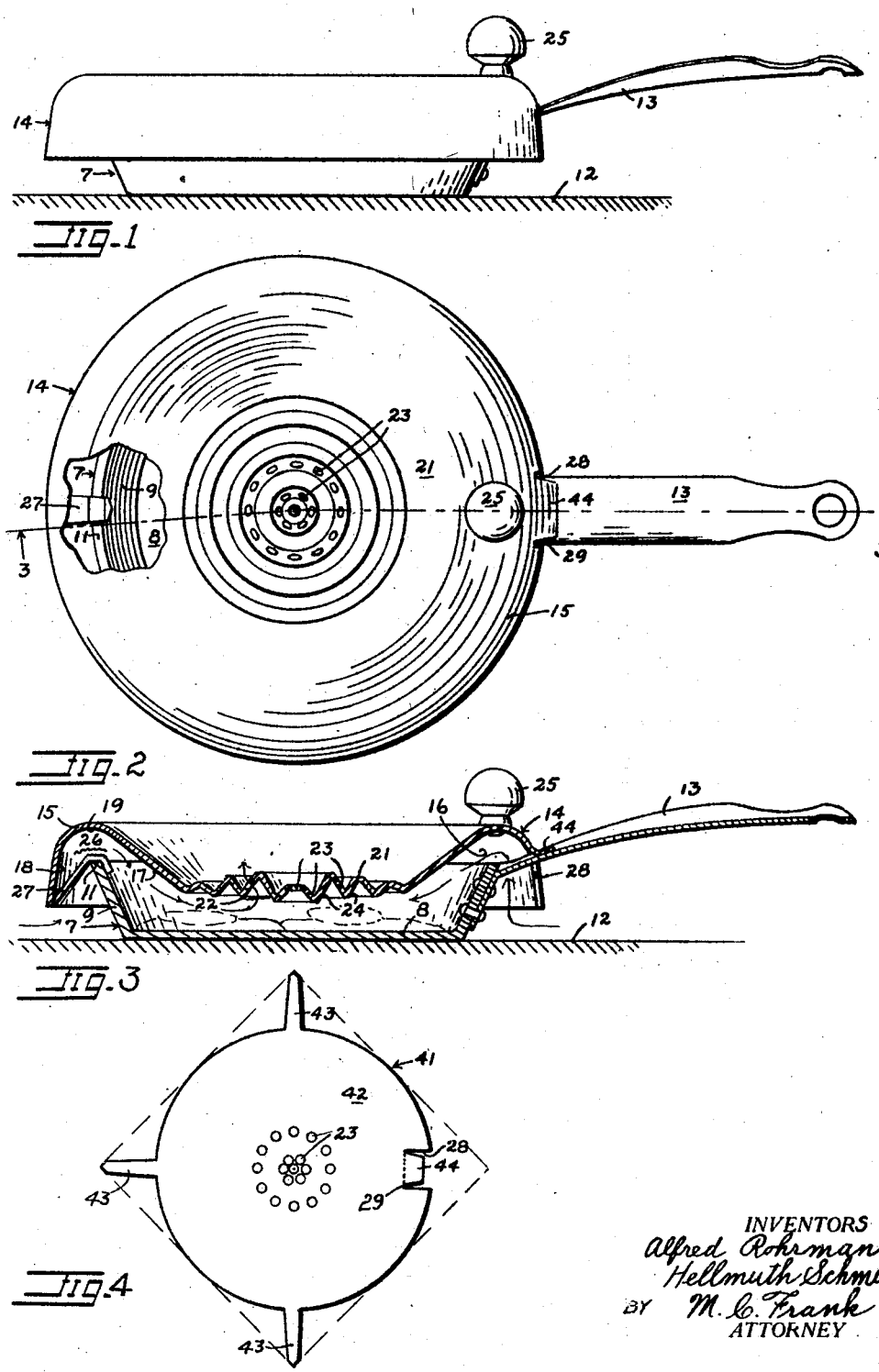

1,787,172

UNITED STATES PATENT OFFICE

ALFRED ROHRMANN, OF OAKLAND, AND HELLMUTH SCHMIDT, OF BERKELEY, CALIFORNIA

COVER FOR COOKING VESSELS

Application filed January 21, 1929. Serial No. 333,865.

The invention relates to a cover for use with a cooking vessel, and to an improved cooking method which said cover is arranged to effect in combination with the vessel and a source of heat for cooking.

An object of the invention is to provide a cover of the class described which is arranged to cooperate with an associated vessel to direct a stream of air at a cooking temperature against the upper side of food in the vessel for cooking said upper side of the food in a simple and improved manner.

Another object of the invention is to provide a cover of the class described which may be operatively used with cooking vessels of usual structure, thereby avoiding any necessity for providing vessels of special structure for use with the cover.

A further object of the invention is to provide a cover of the class described which is arranged to derive the aforesaid stream of heated air from the heat source which supplies cooking heat for application to the lower surface of the food.

Yet another object of the invention is to provide for a maximum utilization of the available cooking heat.

A still further object is to provide a cover of the class described which is adapted to be shaped from a single blank of sheet material, thereby minimizing the production cost of the cover.

The invention possesses other objects and features of advantage, some of which, with the foregoing, will be set forth in the following description of a preferred form of the invention which is illustrated in the accompanying drawings, in which:

Figure 1 is a side elevation of a cover embodying the invention and operatively disposed on a frying-pan.

Figure 2 is a plan view of the cover and pan, a portion of the cover being broken away to disclose a cover mounting means.

Figure 3 is a sectional view taken on the line 3—3 in Figure 2.

Figure 4 is a minified plan of a blank from which the cover is arranged to be shaped to its required form.

As herewith particularly illustrated, a cover embodying the invention is provided for operative use with a circular pan 7 arranged for use as a frying-pan. The pan 7 is of a usual form and is seen to comprise a bottom 8, and an oblique and continuous side wall 9 terminating at a rim 11 which defines a plane parallel to that of the bottom 8. The pan and its contents are arranged to be heated from below either by the direct application of heat thereto from a heat source or by its disposal over a heat radiating surface; as shown, the pan is supportedly mounted on a surface 12 which is arranged to be heated to a proper temperature by any suitable means, no heating means being disclosed, however, as such forms no element of the present invention. The pan 7 is formed of a heat conducting material, and is provided with a laterally extending handle 13.

It will now be noted that in cooking foods by a direct application of heat at the bottom of a cooking vessel, the major part of the cooking process occurs primarily toward the bottom of the food which must therefore be stirred or turned over for completing the cooking thereof. This condition is particularly true in the case of foods which are cooked without immersion in a liquid, for in the latter case no distribution of the heat by liquid convection is possible. It is therefore clear that present methods of cooking are extremely wasteful as to the use of heat and the time required for cooking, and the present invention is particularly directed to an elimination of such wastes by utilizing heat which would otherwise be wasted to effect the cooking process at the top of the food while the usual cooking process proceeds at the bottom.

For carrying out the aforesaid and other purposes of the invention, a novel cover 14 is provided for use over pans of the class described. Essentially, the cover 14 is formed to provide in its lower face and in an outer portion 15 thereof, a downwardly opening annular groove 16 for receiving the pan rim 11, said groove being defined by sloping inner and outer side face portions 17 and 18 connected by and extending from a cylindrically curved face portion 19, the groove being widest at its mouth, these relations being particularly brought out in Figure 3. The inner portion 21 of the cover is formed to provide a lower face 22 extending from and generally in the plane of the lower edge of the inner groove face 17, and is provided centrally thereof with a plurality of perforations 23 extending upwardly through the cover. Preferably, and as shown, the face 22 is formed to have a plurality of coaxial and annular ridges 24 of generally triangular section, the utility of said ridges being hereinafter brought out. If desired, a handle may be provided on the cover 14; as shown, a knob 25 is provided at the edge thereof for use as a handle.

The cover 14, it will now be noted, is arranged, when operatively disposed with respect to the pan 7, to be so positioned that the pan rim 11 is substantially equally spaced from the sides of the groove 16 and with said sides terminating below the plane of the rim whereby the cover face 22 lies below said plane. In this manner, a continuous annular passage 26 is defined over the pan rim 11, said passage being of inverted channel section transversely of said rim. Means are provided for securing the cover in the aforesaid spaced and coaxial relation to the pan, and as shown, such means comprises the provision of a plurality of members 27 extending inwardly and upwardly from the free edge of the cover structure and formed at their free extremities to provide hooks for engagement over the rim 11 in a manner to properly support the cover on the pan. With the pan having the handle 13, the cover edge would be notched, as shown at 28, to permit the proper disposal of the cover on the pan, the inner notch edge 29 being here shown as engaging the pan rim as a supporting means for the cover thereat in lieu of one of the members 27.

A cover 14 embodying the hereinbefore described features may obviously be formed as a cast member. It is preferred however, in the interests of cheapness and other considerations, to provide the cover by forming the same of a a suitably shaped blank of sheet metal, a minified view of a suitable blank 41 being shown in Figure 4. The blank 41, it is noted, includes a disc-shaped part 42 providing the cover portions 15 and 21 and a plurality of tabs 43 extending integrally therefrom for forming the supporting members 27. The blank is also provided with the notch 28, and the inner edge 29 of said notch is provided with a tab 44, which is arranged to be formed as a lip for flat engagement with the pan handle. The blank 41, it is noted, is arranged to be stamped from a square sheet of material, the tabs 43 being taken out of what would otherwise be wasted material at three corners of the square. The outline of the original square sheet is indicated in dash lines in Figure 4. After the blank 41 is cut out, it may be shaped by a die-pressing operation to form the cover 14. The perforations 23 may be provided in the cover during either the blank-cutting or cover-shaping steps, the former being assumed in the present instance. It is noted that the lip 44 and support members 27 may be variably shaped for carrying the cover at different heights from the pan bottom, a usually sufficient adjustment of the disposal of the cover being thus permitted.

It will now be noted that when heat is applied to the bottom of the pan for cooking eggs or other food therein, the heated air and vapors rising from the pan and food are allowed to escape through the cover perforations 23 by reason of the permitted inflow of air beneath the cover through the passage 26. But the inlet end of said passage, which is defined between the outer side of the pan wall 9 and the groove face 18, is arranged to receive air which must first pass over the portion of the heating surface adjacent the pan and this air is thus preheated before and as it enters the passage, it being noted that the free edge of the cover is arranged to extend well below the pan rim whereby the inlet end of the passage constitutes an annular hood for collecting the heated air. Assuming a constant supply of heat at the pan, it will be clear that the temperature acquired by the air entering the passage 26 will vary inversely as the flow rate of said air, which rate must accordingly be such that the air delivered within the pan from said passage will have acquired a food cooking temperature. It will, of course, be clear that the convection circulation of air through the pan is essentially that of relatively dry and heated air from without the pan, so that the cooking effected at the top of the food is that of dry heat and the food is not parboiled at the top as when a tight cover is used on a frying-pan in a usual manner.

Preferably, and as shown, the rate of air flow is controlled at the exit perforations 23 in the cover by providing an effective passage thereat which causes the circulated air stream to be smaller at said passage than at any other point of the stream. A further retardation and control of the air flow rate is effected by the depending cover ridges 24 which act as baffles to create a turbulence in the air stream and so insure a maximum distribution of heat therefrom to the food. Preferably, the ridges 24 are of increasing depth toward the center of the cover whereby, in cooperation with the other control factors for the air stream, they assist in distributing the air stream for insuring a particularly even distribution of cooking heat to the food in the pan.

It will now be particularly noted that the cover 14 might be used in the cooking of food placed directly on the surface 12, in which case said surface would be that of a griddle plate or the like. In this event, there being no vessel sides for supporting the cover, the tabs 43 would be turned downwardly to provide supporting feet for the cover, it being obvious that the lip 44 would, in the present case, be replaced by a tab 43. Under these circumstances, the heated air rising from the cooking surface beside the food would be utilized for a cooking circulation over the top of the food in the same manner as when the cover is used with a pan having side walls. Furthermore, the surface 12 might be perforated as in a grille or gridiron whereby the heat is directly applied to the food from below, the cooking control action of the cover being the same as before. In view of the foregoing, the use of the cover over a griddle plate or grille is therefore seen as falling within the scope of the present invention.

From the foregoing disclosure, it will now be clear that an improved cooking method has been provided as well as a simple and effective cover for carrying out said method. Furthermore, while the present disclosure is in terms of a circular pan, it is readily understood that the essential principles thereof might well be incorporated in covers for pans of other shape and structure or for griddle plates or grilles without departing from the spirit of the invention.

It is noted that the essential cooking method herein disclosed is also disclosed in our copending application for United States Letters Patent on a culinary means, filed Jan. 21, 1929, Serial No. 333,864, and that the said method is more broadly set forth and claimed in said application.

From the foregoing description taken in connection with the accompanying drawings, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative, and that such changes may be made, when desired, as fall within the scope of the appended claims.

Having thus described our invention, we claim as new and desire to secure by Letters Patent of the United States the following:

1. In combination with a cooking vessel having a rim defining a top opening, a cover arranged to be supported over said opening, said cover having an outer portion formed to provide a downwardly opening groove for receiving said rim in spaced relation from the walls thereof and a perforated inner portion arranged for disposal below the plane of said rim, and means on said cover engageable with the vessel for supporting the cover with said portions thereof in the aforesaid relations to the rim.

2. In combination with a cooking vessel having a continuous rim defining a top opening, a cover provided with top perforations and arranged to be supported over said opening and comprising an outer portion providing a downwardly opening groove for receiving said rim in transversely spaced relation from the inner and outer groove walls and cooperative with the rim to define an air passage thereover for the full length thereof.

3. In combination with a cooking vessel having a continuous rim defining a top opening, a cover for the opening comprising an outer portion providing a downwardly opening groove for receiving said rim in spaced relation from the groove walls and cooperative with the rim when in said relation thereto to define an air inlet passage thereover for the full length thereof, an inner cover portion integral with said first portion and having a lower face arranged for disposal below the plane of said rim when said groove is in the aforesaid relation to the rim, said last cover portion being perforated to provide an air outlet passage.

4. In a cover for a cooking pan, an outer portion providing a downwardly opening groove to receive the pan rim in transversely spaced relation from the groove sides and an inner portion integral with said first portion and having a lower face terminating at the inner groove edge, the outer groove edge defining a plane no higher than the plane of the inner groove edge.

5. In combination with a cooking vessel having a rim defining a top opening, an exteriorly perforated cover for said opening and cooperative with said rim for directing heated air into the vessel from above the rim and beneath the cover, and deflector means on said cover for creating a turbulence in the air as it passes therebeneath and to the perforations thereof.

In testimony whereof, we affix our signatures.

ALFRED ROHRMANN.
HELLMUTH SCHMIDT.